US007613310B2

(12) United States Patent
Mao

(10) Patent No.: US 7,613,310 B2
(45) Date of Patent: Nov. 3, 2009

(54) AUDIO INPUT SYSTEM

(75) Inventor: Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 716 days.

(21) Appl. No.: 10/650,409

(22) Filed: Aug. 27, 2003

(65) Prior Publication Data

US 2005/0047611 A1 Mar. 3, 2005

(51) Int. Cl.
*H04B 15/00* (2006.01)

(52) U.S. Cl. .................... 381/94.7; 381/94.2; 704/233; 367/119

(58) Field of Classification Search .................. 381/92, 381/94.7, 94.1, 94.2, 94.3, 122; 704/226, 704/233; 463/36-38, 47; 367/118, 119
See application file for complete search history.

(56) References Cited

U.S. PATENT DOCUMENTS

| | | | | |
|---|---|---|---|---|
| 4,305,131 | A * | 12/1981 | Best | 715/716 |
| 5,335,011 | A | 8/1994 | Addeo et al. | |
| 5,353,376 | A * | 10/1994 | Oh et al. | 704/233 |
| 5,581,620 | A * | 12/1996 | Brandstein et al. | 381/92 |
| 6,173,059 | B1 | 1/2001 | Huang et al. | |
| 6,339,758 | B1 | 1/2002 | Kanazawa et al. | |
| 7,142,677 | B2 * | 11/2006 | Gonopolskiy et al. | 381/92 |
| 7,203,323 | B2 * | 4/2007 | Tashev | 381/92 |
| 7,206,418 | B2 * | 4/2007 | Yang et al. | 381/92 |
| 2002/0009203 | A1 * | 1/2002 | Erten | 381/92 |
| 2003/0160862 | A1 | 8/2003 | Charlier et al. | |
| 2004/0047464 | A1 | 3/2004 | Yu et al. | |
| 2004/0057586 | A1 * | 3/2004 | Licht | 381/94.7 |

(Continued)

FOREIGN PATENT DOCUMENTS

EP 0 652 686 A1 5/1995

(Continued)

OTHER PUBLICATIONS

Wilson and Darrell, "*Audio-Video Array Source Localization for Intelligent Environments*", 2002, IEEE Dept. Of Electrical Eng and Computer Science, Massachusetts Inst. Of Technology, Cambridge, MA 02139.

(Continued)

*Primary Examiner*—Vivian Chin
*Assistant Examiner*—Jason R Kurr
(74) *Attorney, Agent, or Firm*—Martine Penilla & Gencarella, LLP

(57) ABSTRACT

A method for reducing noise associated with an audio signal received through a microphone sensor array is provided. The method initiates with enhancing a target signal component of the audio signal through a first filter. Simultaneously, the target signal component is blocked by a second filter. Then, the output of the first filter and the output of the second filter are combined in a manner to reduce noise without distorting the target signal. Next, an acoustic set-up associated with the audio signal is periodically monitored. Then, a value of the first filter and a value of the second filter are both calibrated based upon the acoustic set-up. A system capable of isolating a target audio signal from multiple noise sources, a video game controller, and an integrated circuit configured to isolate a target audio signal are included.

12 Claims, 9 Drawing Sheets

U.S. PATENT DOCUMENTS

| | | | |
|---|---|---|---|
| 2004/0213419 | A1 | 10/2004 | Varma et al. |
| 2005/0047611 | A1 | 3/2005 | Mao |

FOREIGN PATENT DOCUMENTS

| | | |
|---|---|---|
| EP | 1 489 586 A1 | 12/2004 |

OTHER PUBLICATIONS

Fiala et al., "*A Panoramic Video and Acoustic Beamforming Sensor for Videoconferencing*", 2004 IEEE, Computational Video Group, National Research Council, Ottawa, CA KlA 0R6.

Osamu Hoshuyama and Akihiko Sugiyama, "A Robust Generalized Sidelobe Canceller with a Blocking Matrix Using Leaky Adaptive Filters", Electronics and Communications in Japan, Part 3, vol. 80, 1997 pp. 56 - 65.

Lucas Parra and Christopher Alvino, "Geometric Source Separation: Merging Convolutive Source Separation With Geometric Beamforming", Sarnoff Corporation.

Shoko Araki, Shoji Makino, Ryo Mukai and Hiroshi Saruwatari, "Equivalence Between Frequency Domain Blind Source Separation and Frequency Domain Adaptive Null Beamformers", NTT Communication Science Laboratories.

Ofir Shalvi and Ehud Weinstein, "System Identification Using Nonstationary Signals," IEEE Transactions on Signal Processing, vol. 44, No. 8, Aug. 1996.

David Burshtein and Sharon Gannot, "Speech Enhancement Using a Mixture-Maximum Model," IEEE Transactions on Speech and Audio Processing, vol. 10, No. 6, Sep. 2002.

Barry D. Van Veen and Kevin M. Buckley, "Beamforming: A Versatile Approach to Spatial Filtering," IEEE ASSP Magazine, Apr. 1998.

John J. Shynk, "Frequency-Domain and Multirate Adaptive Filtering," IEEE SP Magazine, Jan. 1992.

* cited by examiner

AUDIO INPUT SYSTEM

BACKGROUND OF THE INVENTION

1. Field of the Invention

This invention relates generally to audio processing and more particularly to a microphone array system capable of tracking an audio signal from a particular source while filtering out signals from other competing or interfering sources.

2. Description of the Related Art

Voice input systems are typically designed as a microphone worn near the mouth of the speaker where the microphone is tethered to a headset. Since this imposes a physical restraint on the user, i.e., having to wear the headset, users will typically use the headset for only a substantial dictation and rely on keyboard typing for relatively brief input and computer commands in order to avoid wearing the headset.

Video game consoles have become a commonplace item in the home. The video game manufacturers are constantly striving to provide a more realistic experience for the user and to expand the limitations of gaming, e.g., on line applications. For example, the ability to communicate with additional players in a room having a number of noises being generated, or even for users to send and receive audio signals when playing on-line games against each other where background noises and noise from the game itself interferes with this communication, has so far prevented the ability for clear and effective player to player communication in real time. These same obstacles have prevented the ability of the player to provide voice commands that are delivered to the video game console. Here again, the background noise, game noise and room reverberations all interfere with the audio signal from the player.

As users are not so inclined to wear a headset, one alternative to the headset is the use of microphone arrays in order to capture the sound. However, shortcomings with the microphone arrays currently on the market today is the inability to track a sound from a moving source and/or the inability to separate the source sound from the reverberation and environmental sounds from the general area being monitored. Additionally, with respect to a video game application, a user will move around relative to the fixed positions of the game console and the display monitor. Where a user is stationary, the microphone array may be able to be "factory set" to focus on audio signals emanating from a particular location or region. For example, inside an automobile, the microphone array may be configured to focus around the driver's seat region for a cellular phone application. However, this type of microphone array is not suitable for a video game application. That is, a microphone array on the monitor or game console would not be able to track a moving user, since the user may be mobile, i.e., not stationary, during a video game. Furthermore, a video game application, a microphone array on the game controller is also moving relative to the user. Consequently, for a portable microphone array, e.g., affixed to the game controller, the source positioning poses a major challenge to higher fidelity sound capturing in selective spatial volumes.

Another issue with the microphone arrays and associated systems is the inability to adapt to high noise environments. For example, where multiple sources are contributing to an audio signal, the current systems available for consumer devices are unable to efficiently filter the signal from a selected source. It should be appreciated that the inability to efficiently filter the signal in a high noise environment only exacerbates the source positioning issues mentioned above. Yet another shortcoming of the microphone array systems is the lack of bandwidth for a processor to handle the input signals from each microphone of the array and track a moving user.

As a result, there is a need to solve the problems of the prior art to provide a microphone array that is capable of capturing an audio signal from a user when the user and or the device to which the array is affixed are capable of changing position. There is also a need to design the system for robustness in a high noise environment where the system is configured to provide the bandwidth for multiple microphones sending input signals to be processed.

SUMMARY OF THE INVENTION

Broadly speaking, the present invention fills these needs by providing a method and apparatus that defines a microphone array framework capable of identifying a source signal irrespective of the movement of microphone array or the origination of the source signal. It should be appreciated that the present invention can be implemented in numerous ways, including as a method, a system, computer readable medium or a device. Several inventive embodiments of the present invention are described below.

In one embodiment, a method for processing an audio signal received through a microphone array is provided. The method initiates with receiving a signal. Then, adaptive beam-forming is applied to the signal to yield an enhanced source component of the signal. Inverse beam-forming is also applied to the signal to yield an enhanced noise component of the signal. Then, the enhanced source component and the enhanced noise component are combined to produce a noise reduced signal.

In another embodiment, a method for reducing noise associated with an audio signal received through a microphone sensor array is provided. The method initiates with enhancing a target signal component of the audio signal through a first filter. Simultaneously, the target signal component is blocked by a second filter. Then, the output of the first filter and the output of the second filter are combined in a manner to reduce noise without distorting the target signal. Next, an acoustic set-up associated with the audio signal is periodically monitored. Then, a value of the first filter and a value of the second filter are both calibrated based upon the acoustic set-up.

In yet another embodiment, a computer readable medium having program instructions for processing an audio signal received through a microphone array is provided. The computer readable medium includes program instructions for receiving a signal and program instructions for applying adaptive beam-forming to the signal to yield an enhanced source component of the signal. Program instructions for applying inverse beam-forming to the signal to yield an enhanced noise component of the signal are included. Program instructions for combining the enhanced source component and the enhanced noise component to produce a noise reduced signal are provided In still yet another embodiment, a computer readable medium having program instructions for reducing noise associated with an audio signal is provided. The computer readable medium includes program instructions for enhancing a target signal associated with a listening direction through a first filter and program instructions for blocking the target signal through a second filter. Program instructions for combining an output of the first filter and an output of the second filter in a manner to reduce noise without distorting the target signal are provided. Program instructions for periodically monitoring an acoustic set up associated with the audio signal are included. Program instructions for calibrating both the first filter and the second filter based upon the acoustic setup are provided.

In another embodiment, a system capable of isolating a target audio signal from multiple noise sources is provided. The system includes a portable consumer device configured to move independently from a user. A computing device is included. The computing device includes logic configured enhance the target audio signal without constraining movement of the portable consumer device. A microphone array affixed to the portable consumer device is provided. The microphone array is configured to capture audio signals, wherein a listening direction associated with the microphone array is controlled through the logic configured to enhance the target audio signal.

In yet another embodiment, a video game controller is provided. The video game controller includes a microphone array affixed to the video game controller. The microphone array is configured to detect an audio signal that includes a target audio signal and noise. The video game controller includes circuitry configured to process the audio signal. Filtering and enhancing logic configured to filter the noise and enhance the target audio signal as a position of the video game controller and a position of a source of the target audio signal change is provided. Here, the filtering of the noise is achieved through a plurality of filter-and-sum operations.

An integrated circuit is provided. The integrated circuit includes circuitry configured to receive an audio signal from a microphone array in a multiple noise source environment. Circuitry configured to enhance a listening direction signal is included. Circuitry configured to block the listening direction signal, i.e., enhance a non listening direction signal, and circuitry configured to combine the enhanced listening direction signal and the enhanced non-listening direction signal to yield a noise reduced signal. Circuitry configured to adjust a listening direction according to filters computed through an adaptive array calibration scheme is included.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1A:
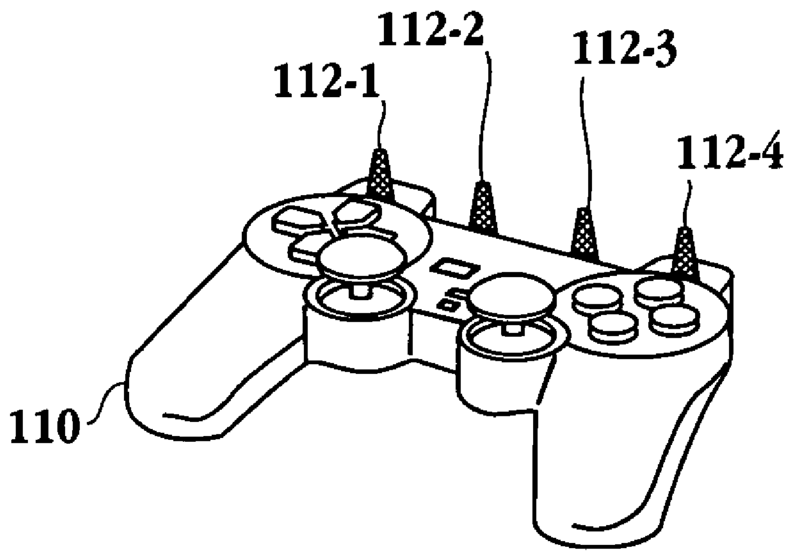
FIGS. 1A and 1B are exemplary microphone sensor array placements on a video game controller in accordance with one embodiment of the invention.

An invention is described for a system, apparatus and method for an audio input system configured to isolate a source audio signal from a noisy environment in real time through an economic and efficient scheme. It will be obvious, however, to one skilled in the art, that the present invention may be practiced without some or all of these specific details. In other instances, well known process operations have not been described in detail in order not to unnecessarily obscure the present invention.

The embodiments of the present invention provide a system and method for an audio input system associated with a portable consumer device through a microphone array. The voice input system is capable of isolating a target audio signal from multiple noise signals. Additionally, there are no constraints on the movement of the portable consumer device, which has the microphone array affixed thereto. The microphone array framework includes four main modules in one embodiment of the invention. The first module is an acoustic echo cancellation (AEC) module. The AEC module is configured to cancel portable consumer device generated noises. For example, where the portable consumer device is a video game controller, the noises, associated with video game play, i.e., music, explosions, voices, etc., are all known. Thus, a filter applied to the signal from each of the microphone sensors of the microphone array may remove these known device generated noises. In another embodiment, the AEC module is optional and may not be included with the modules described below. Further details on acoustic echo cancellation may be found in "Frequency-Domain and Multirate Adaptive Filtering" by John J. Shynk, IEEE Signal Processing Magazine, pp. 14-37, January 1992. This article is incorporated by reference for all purposes.

A second module includes a separation filter. In one embodiment, the separation filter includes a signal passing filter and a signal blocking filter. In this module, array beam-forming is performed to suppress a signal not coming from an identified listening direction. Both, the signal passing filter and the blocking filter are finite impulse response (FIR) filters that are generated through an adaptive array calibration module. The adaptive array calibration module, the third module, is configured to run in the background. The adaptive array calibration module is further configured to separate interference or noise from a source signal, where the noise and the source signal are captured by the microphone sensors of the sensor array. Through the adaptive array calibration module, as will be explained in more detail below, a user may freely move around in 3-dimensional space with six degrees of freedom during audio recording. Additionally, with reference to a video game application, the microphone array framework discussed herein, may be used in a loud gaming environment with background noises which may include, television audio signals, high fidelity music, voices of other players, ambient noise, etc. As discussed below, the signal passing filter is used by a filter-and-sum beam-former to enhance the source signal. The signal blocking filter effectively blocks the source signal and generates interferences or noise, which is later used to generate a noise reduced signal in combination with the output of the signal passing filter.

A fourth module, the adaptive noise cancellation module, takes the interferences from the signal blocking filter for subtraction from the beam-forming output, i.e., the signal passing filter output. It should be appreciated that adaptive noise cancellation (ANC) may be analogized to AEC with the exception that the noise templates for ANC are generated from the signal blocking filter of the microphone sensor array, instead of a video game console's output. In one embodiment, in order to maximize noise cancellation while minimizing target signal distorting, the interferences used as noise templates should prevent the source signal leakage that is covered by the signal blocking filter. Additionally, the use of ANC as described herein, enables the attainment of high interference-reduction performance with a relatively small number of microphones arranged in a compact region.

Figure 1B:
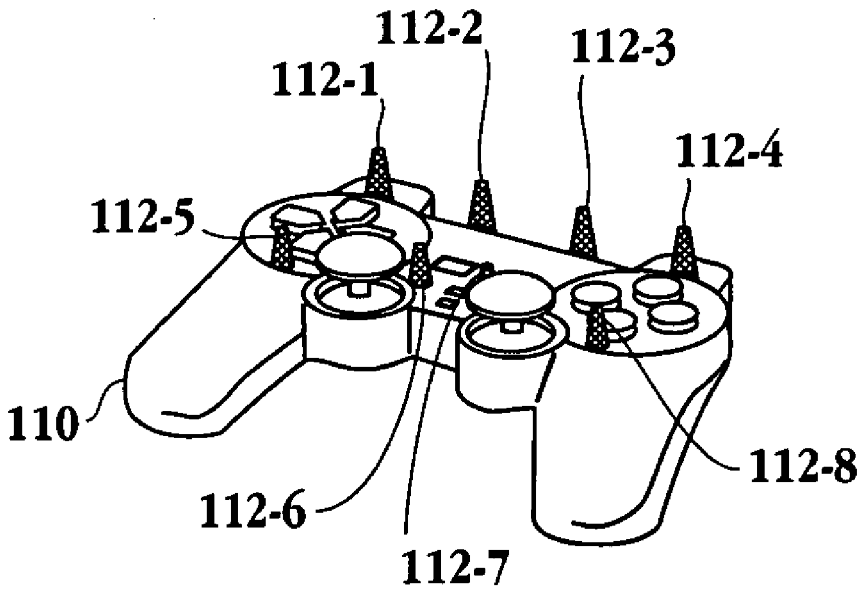

FIGS. 1A and 1B are exemplary microphone sensor array placements on a video game controller in accordance with one embodiment of the invention. FIG. 1A illustrates microphone sensors 112-1, 112-2, 112-3 and 112-4 oriented in an equally spaced straight line array geometry on video game controller 110. In one embodiment, each of the microphone sensors 112-1 through 112-4 are approximately 2.5 cm apart. However, it should be appreciated that microphone sensors 112-1 through 112-4 may be placed at any suitable distance apart from each other on video game controller 110. Additionally, video game controller 110 is illustrated as a SONY PLAYSTATION 2 Video Game Controller, however, video game controller 110 may be any suitable video game controller.

FIG. 1B illustrates an 8 sensor, equally spaced rectangle array geometry for microphone sensors 112-1 through 112-8 on video game controller 110. It will be apparent to one skilled in the art that the number of sensors used on video game controller 110 may be any suitable number of sensors. Furthermore, the audio sampling rate and the available mounting area on the game controller may place limitations on the configuration of the microphone sensor array. In one embodiment, the arrayed geometry includes four to twelve sensors forming a convex geometry, e.g., a rectangle. The convex geometry is capable of providing not only the sound source direction (two-dimension) tracking as the straight line array does, but is also capable of providing an accurate sound location detection in three-dimensional space. As will be explained further below, the added dimension will assist the noise reduction software to achieve three-dimensional spatial volume based arrayed beam-forming. While the embodiments described herein refer typically to a straight line array system, it will be apparent to one skilled in the art that the embodiments described herein may be extended to any number of sensors as well as any suitable array geometry set up. Moreover, the embodiments described herein refer to a video game controller having the microphone array affixed thereto. However, the embodiments described below may be extended to any suitable portable consumer device utilizing a voice input system.

In one embodiment, an exemplary four-sensor based microphone array may be configured to have the following characteristics:

1. An audio sampling rate that is 16 kHz;
2. A geometry that is an equally spaced straight-line array, with a spacing of one-half wave length at the highest frequency of interest, e.g., 2.0 cm. between each of the microphone sensors. The frequency range is about 120 Hz to about 8 kHz;
3. The hardware for the four-sensor based microphone array may also include a sequential analog-to-digital converter with 64 kHz sampling rate; and
4. The microphone sensor may be a general purpose omni-directional sensor.

It should be appreciated that the microphone sensor array affixed to a video game controller may move freely in 3-D space with six degrees of freedom during audio recording. Furthermore, as mentioned above, the microphone sensor array may be used in extremely loud gaming environments which include multiple background noises, e.g., television audio signals, high-fidelity music signals, voices of other players, ambient noises, etc. Thus, the memory bandwidth and computational power available through a video game console in communication with the video game controller makes it possible for the console to be used as a general purpose processor to serve even the most sophisticated real-time signal processing applications. It should be further appreciated that the above configuration is exemplary and not meant to be limiting as any suitable geometry, sampling rate, number of microphones, type of sensor, etc., may be used.

Figure 2:
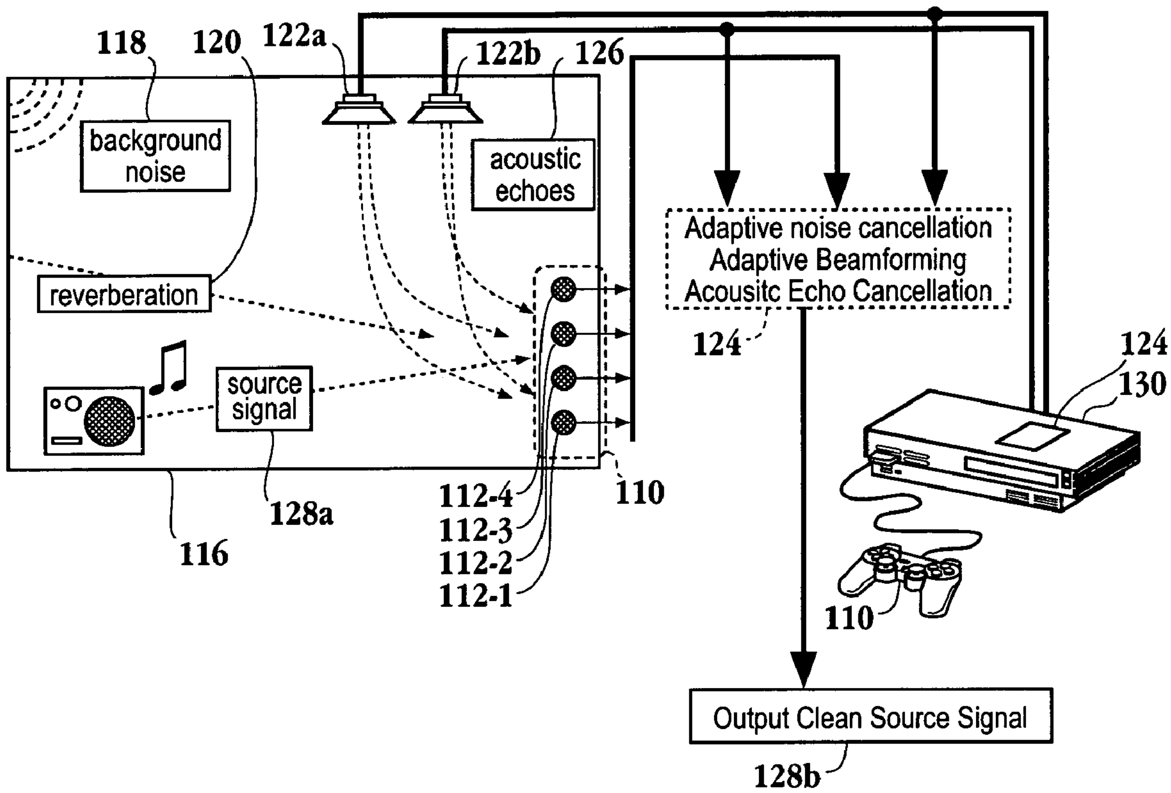
FIG. 2 is a simplified high-level schematic diagram illustrating a robust voice input system in accordance with one embodiment of the invention.

FIG. 2 is a simplified high-level schematic diagram illustrating a robust voice input system in accordance with one embodiment of the invention. Video game controller 110 includes microphone sensors 112-1 through 112-4. Here, video game controller 110 may be located in high-noise environment 116. High-noise environment 116 includes background noise 118, reverberation noise 120, acoustic echoes 126 emanating from speakers 122*a* and 122*b*, and source signal 128*a*. Source signal 128*a* may be a voice of a user playing the video game in one embodiment. Thus, source signal 128*a* may be contaminated by sounds generated from the game console or video game application, such as music, explosions, car racing, etc. In addition, background noise, e.g., music, stereo, television, high-fidelity surround sound, etc., may also be contaminating source signal 128*a*. Additionally, environmental ambient noises, e.g., air conditioning, fans, people moving, doors slamming, outdoor activities, video game controller input noises, etc., will also add to the contamination of source signal 128*a*, as well as voices from other game players and room acoustic reverberation.

The output of the microphone sensors 112-1 through 112-4 is processed through module 124 in order to isolate the source signal and provide output source signal 128*b*, which may be used as a voice command for a computing device or as communication between users. Module 124 includes acoustic echo cancellation module, adaptive beam-forming module, and adaptive noise cancellation module. Additionally, an array calibration module is running in the background as described below. As illustrated, module 124 is included in video game console 130. As will be explained in more detail below, the components of module 124 are tailored for a portable consumer device to enhance a voice signal in a noisy environment without posing any constraints on a controller's position, orientation, or movement. As mentioned above, acoustic echo cancellation reduces noise generated from the console's sound output, while adaptive beam-forming suppresses signals not coming from a listening direction, where the listening direction is updated through an adaptive array calibration scheme. The adaptive noise cancellation module is configured to subtract interferences from the beam-forming output through templates generated by a signal filter and a blocking filter associated with the microphone sensor array.

Figure 3:
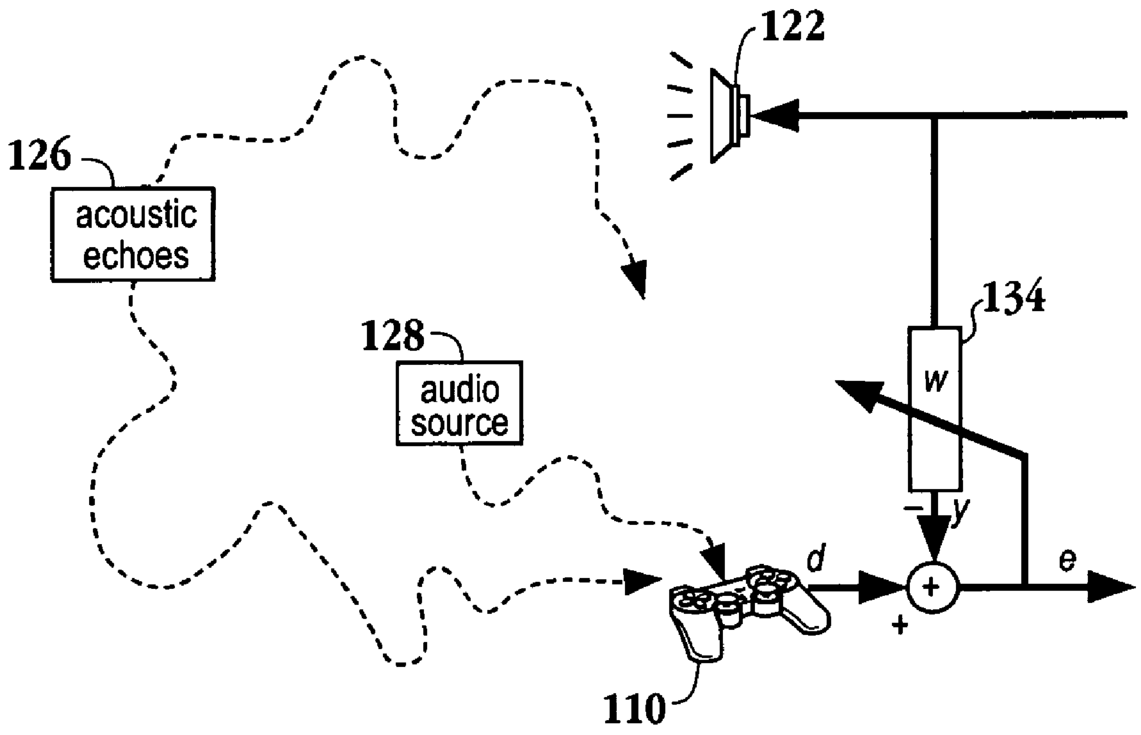
FIG. 3 is a simplified schematic diagram illustrating an acoustic echo cancellation scheme in accordance with one embodiment of the invention

FIG. 3 is a simplified schematic diagram illustrating an acoustic echo cancellation scheme in accordance with one embodiment of the invention. As mentioned above, AEC cancels noises generated by the video game console, i.e., a game being played by a user. It should be appreciated that the audio signal being played on the console may be intercepted in either analog or digital format. The intercepted signal is a noise template that may be subtracted from a signal captured by the microphone sensor array on video game controller 110. Here, audio source signal 128 and acoustic echoes 126 are captured through the microphone sensor array. It should be appreciated that acoustic echoes 126 are generated from audio signals emanating from the video game console or video game application. Filter 134 generates a template that effectively cancels acoustic echoes 126, thereby resulting in a signal substantially representing audio source signal 128. It should be appreciated that the AEC may be referred to as pre-processing. In essence, in a noisy environment where the noise includes acoustic echoes generated from the video game console, or any other suitable consumer device generating native audible signals, the acoustic echo cancellation scheme effectively removes these audio signals while not impacting the source signal.

Figure 4:
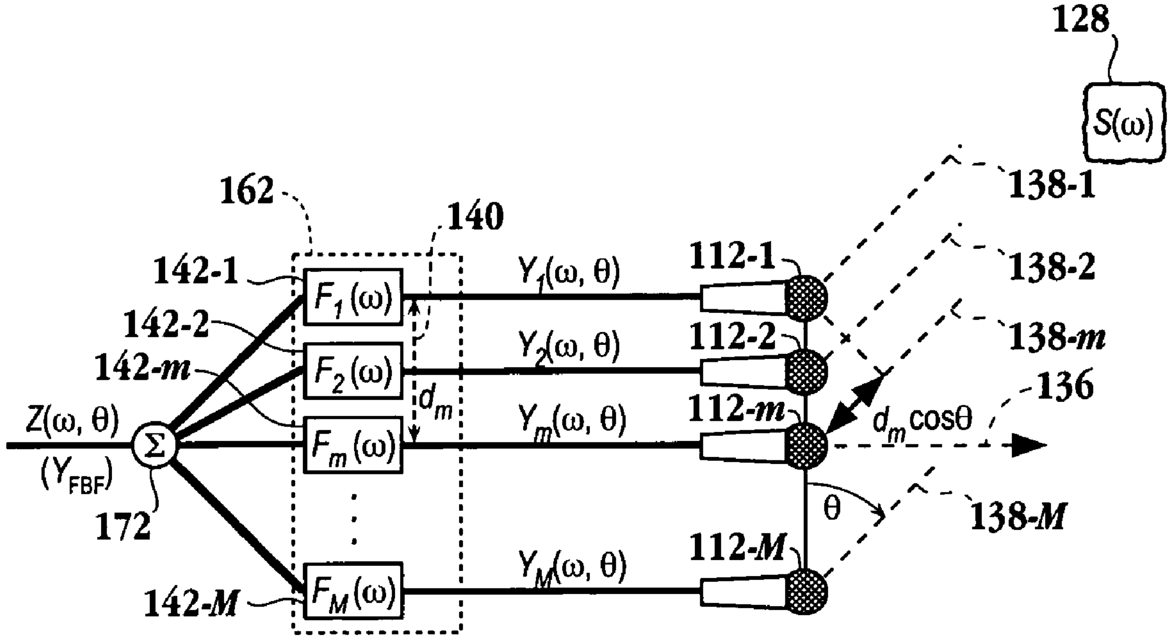
FIG. 4 is a simplified schematic diagram illustrating an array beam-forming module configured to suppress a signal not coming from a listening direction in accordance with one embodiment of the invention.

FIG. 4 is a simplified schematic diagram illustrating an array beam-forming module configured to suppress a signal not coming from a listening direction in accordance with one embodiment of the invention. In one embodiment, the beam-forming is based on filter-and-sum beam-forming. The finite impulse response (FIR) filters, also referred to as signal passing filters, are generated through an array calibration process which is adaptive. Thus, the beam-forming is essentially an adaptive beam-former that can track and steer the beam, i.e., listening direction, toward a source signal 128 without physical movement of the sensor array. It will be apparent to one skilled in the art that beam-forming, which refers to methods that can have signals from a focal direction enhanced, may be thought of as a process to algorithmically (not physically) steer microphone sensors 112-1 through 112-m towards a desired target signal. The direction that the sensors 112-1 through 112-m look at may be referred to as the beam-forming direction or listening direction, which may either be fixed or adaptive at run time.

The fundamental idea behind beam-forming is that the sound signals from a desired source reaches the array of microphone sensors with different time delays. The geometry placement of the array being pre-calibrated, thus, the path-length-difference between the sound source and sensor array is a known parameter. Therefore, a process referred to as cross-correlation is used to time-align signals from different sensors. The time-align signals from various sensors are weighted according to the beam-forming direction. The weighted signals are then filtered in terms of sensor-specific noise-cancellation setup, i.e., each sensor is associated with a filter, referred to as a matched filter $F_1$ $F_M$, 142-1 through 142-M, which are included in signal-passing-filter 160. The filtered signals from each sensor are then summed together through module 172 to generate output $Z(\omega, \theta)$. It should be appreciated that the above-described process may be referred to as auto-correlation. Furthermore, as the signals that do not lie along the beam-forming direction remain misaligned along the time axes, these signals become attenuated by the averaging. As is common with an array-based capturing system, the overall performance of the microphone array to capture sound from a desired spatial direction (using straight line geometry placement) or spatial volumes (using convex geometry array placement) depends on the ability to locate and track the sound source. However, in an environment with complicated reverberation noise, e.g., a videogame environment, it is practically infeasible to build a general sound location tracking system without integrating the environmental specific parameters.

Still referring to FIG. 4, the adaptive beam-forming may be alternatively explained as a two-part process. In a first part, the broadside noise is assumed to be in a far field. That is, the distance from source 128 to microphone centers 112-1 through 112-M is large enough so that it is initially assumed that source 128 is located on a normal to each of the microphone sensors. For example, with reference to microphone sensor 112-m the source would be located along normal 136. Thus, the broadside noise is enhanced by applying a filter referred to as F1 herein. Next, a signal passing filter that is calibrated periodically is configured to determine a factor, referred to as F2, that allows the microphone sensor array to adapt to movement. The determination of F2 is explained further with reference to the adaptive array calibration module. In one embodiment, the signal passing filter is calibrated every 100 milliseconds. Thus, every 100 milliseconds the signal passing filter is applied to the fixed beam-forming. In one embodiment, matched filters 142-1 through 142-M supply a steering factor, F2, for each microphone, thereby adjusting the listening direction as illustrated by lines 138-1 through 138-M. Considering a sinusoidal far-field plane wave propagating towards the sensors at incidence angle of $\theta$ in FIG. 4, the time-delay for the wave to travel a distance of d between two adjacent sensors is given by dmcos $\theta$. Further details on fixed beam-forming may be found in the article entitled "Beamforming: A Versatile Approach to Spatial Filtering" by Barry D. Van Veen and Kevin M. Buckley, IEEE ASSP MAGAZINE April 1988. This article is incorporated by reference for all purposes.

Figure 5:
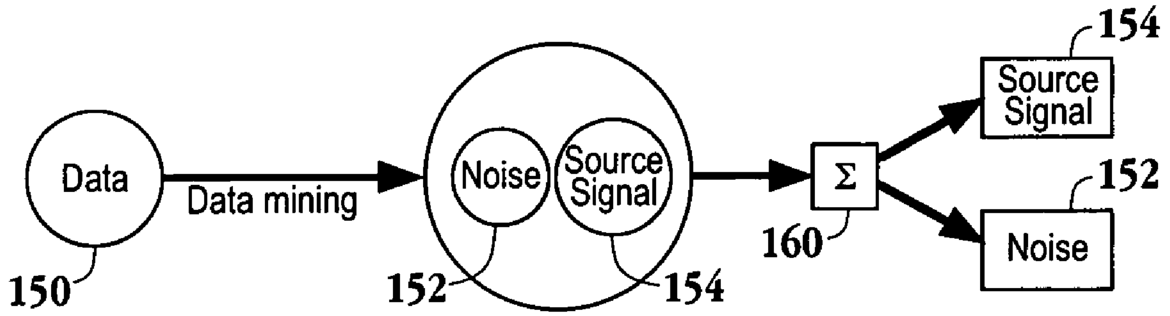
FIG. 5 is a high level schematic diagram illustrating a blind source separation scheme for separating the noise and source signal components of an audio signal in accordance with one embodiment of the invention.

FIG. 5 is a high level schematic diagram illustrating a blind source separation scheme for separating the noise and source signal components of an audio signal in accordance with one embodiment of the invention. It should be appreciated that explicit knowledge of the source signal and the noise within the audio signal is not available. However, it is known that the characteristics of the source signal and the noise are different. For example, a first speaker's audio signal may be distinguished from a second speaker's audio signal because their voices are different and the type of noise is different. Thus, data 150 representing the incoming audio signal, which includes noise and a source signal, is separated into a noise component 152 and source signal 154 through a data mining operation. Separation filter 160 then separates the source signal 150 from the noise signal 152.

One skilled in the art will appreciate that one method for performing the data mining is through independent component analysis (ICA) which analyzes the data and finds independent components through second order statistics in accordance with one embodiment of the invention. Thus, a second order statistic is calculated to describe or define the characteristics of the data in order to capture a sound fingerprint which distinguishes the various sounds. The separation filter is then enabled to separate the source signal from the noise signal. It should be appreciated that the computation of the sound fingerprint is periodically performed, as illustrated with reference to FIGS. 7A-7C. Thus, through this adaptive array calibration process that utilizes blind source separation, the listening direction may be adjusted each period. Once the signals are separated by separation filter 160 it will be apparent to one skilled in the art that the tracking problem is resolved. That is, based upon the multiple microphones of the sensor array the time arrival of delays may be determined for use in tracking source signal 154. One skilled in the art will appreciate that the second order of statistics referred to above may be referred to as an auto correlation or cross correlation scheme. Further details on blind source separation using second order statistics may be found in the article entitled "System Identification Using Non-Stationary Signals" by O. Shalvi and E. Weinstein, IEEE Transactions on Signal Processing, vol-44 (no. 8): 2055-2063, August, 1996. This article is hereby incorporated by reference for all purposes.

Figure 6:
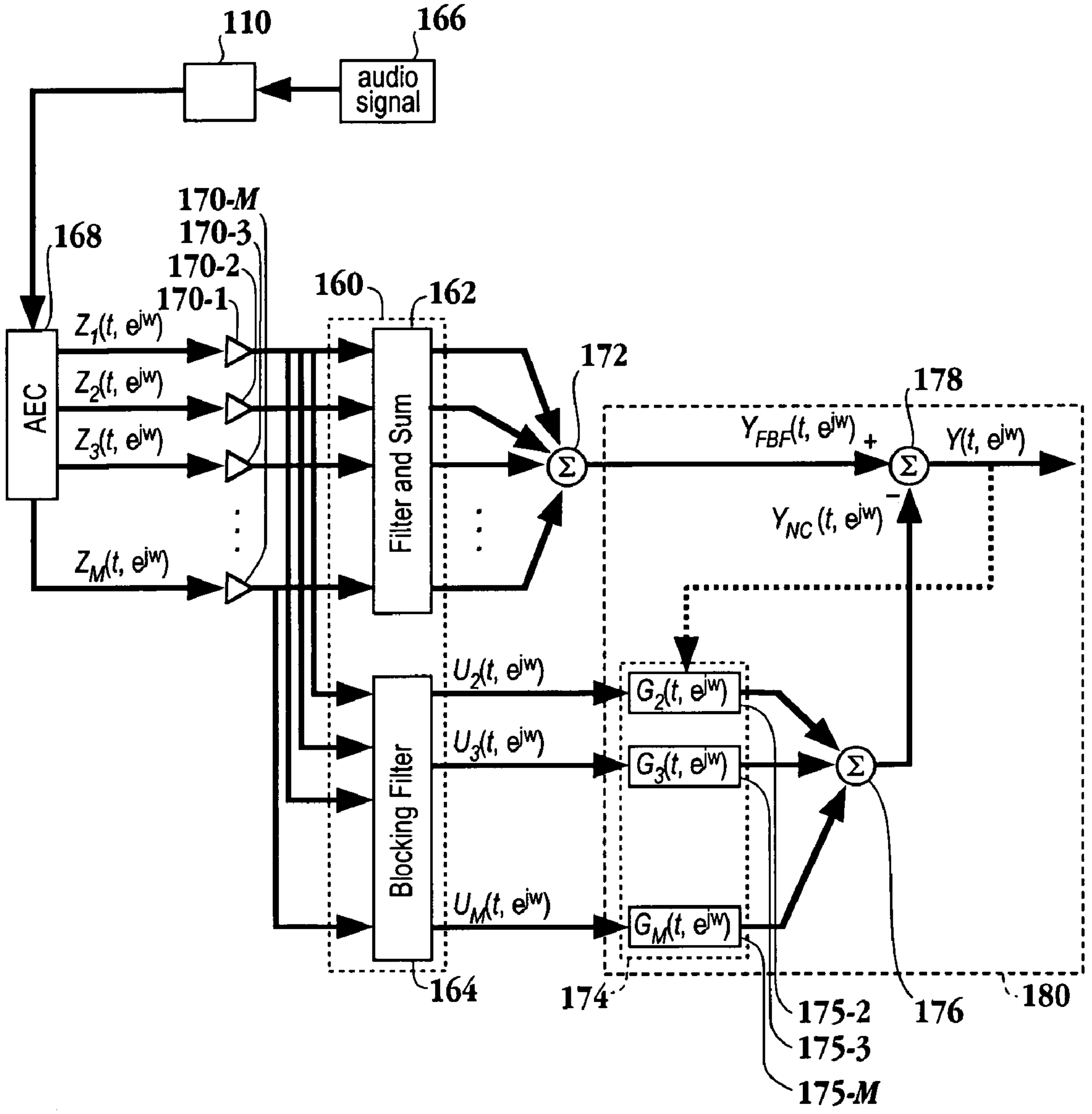
FIG. 6 is a schematic diagram illustrating a microphone array framework that incorporates adaptive noise cancellation in accordance with one embodiment of the invention.

FIG. 6 is a schematic diagram illustrating a microphone array framework that incorporates adaptive noise cancellation in accordance with one embodiment of the invention. Audio signal 166 which includes noise and a source signal is received through a microphone sensor array which may be affixed to a portable consumer device 110, e.g., a videogame controller. The audio signal received by portable consumer device 110 is then pre-processed through AEC module 168. Here, acoustic echo cancellation is performed as described with reference to FIG. 3. Signals $Z_1$ through $Z_m$, which correspond to the number of microphone sensors in the microphone array, are generated and distributed over channels 170-1 through 170-n. It should be appreciated that channel 170-1 is a reference channel. The corresponding signals are then delivered to filter-and-sum module 162. It should be appreciated that filter-and-sum module 162 perform the adaptive beam-forming as described with reference to FIG. 4. At the same time, signals from channels 170-1 through 170-m are delivered to blocking filter 164.

Blocking filter 164 is configured to perform reverse beamforming where the target signal is viewed as noise. Thus, blocking filter 164 attenuates the source signal and enhances noise. That is, blocking filter 164 is configured to determine a calibration coefficient F3 which may be considered the inverse of calibration coefficient F2 determined by the adaptive beam-forming process. One skilled in the art will appreciate that the adaptive array calibration referred to with reference to FIG. 5, occurs in the background of the process described herein. Filter-and-sum module 162 and blocking filter module 164 make up separation filter 160. Noise enhanced signals $U_2$ through $U_m$ are then transmitted to corresponding adaptive filters 175-2 through 175-m, respectively. Adaptive filters 175-2 through 175-m are included in adaptive filter module 174. Here, adaptive filters 175-2 through 175-m are configured to align the corresponding signals for the summation operation in module 176. One skilled in the art will appreciate that the noise is not stationary, therefore, the signals must be aligned prior to the summation operation. Still referring to FIG. 6, the signal from the summation operation of module 176 is then combined with the signal output from summation operation in module 172 in order to provide a reduced noise signal through the summation operation module 178. That is, the enhanced signal output for module 172 is combined with the enhanced noise signal from module 176 in a manner that enhances the desired source signal. It should be appreciated block 180 represents the adaptive noise cancellation operation. Additionally, the array calibration occurring in the background may take place every 100 milliseconds as long as a detected signal-to-noise-ratio is above zero decibels in one embodiment. As mentioned above, the array calibration updates the signal-passing-filter used in filter-and-sum beam-former 162 and signal-blocking-filter 164 that generates pure interferences whose signal-to-noise-ratio is less than −100 decibels.

In one embodiment, the microphone sensor array output signal is passed through a post-processing module to further refine the voice quality based on person-dependent voice spectrum filtering by Bayesian statistic modeling. Further information on voice spectrum filtering may be found in the article entitled "Speech Enhancement Using a Mixture-Maximum Model" by David Burshtein, IEEE Transactions on Speech and Audio Processing vol. 10, No. 6, September 2002. This article in incorporated by reference for all purposes. It should be appreciated that the signal processing algorithms mentioned herein are carried out in the frequency domain. In addition, a fast and efficient Fast Fourier transform (FFT) is applied to reach real time signal response. In one embodiment, the implemented software requires 25 FFT operations with window length of 1024 for every signal input chunk (512 signal samples in a 16 kHz sampling rate). In the exemplary case of a four-sensor microphone array with equally spaced straight line geometry, without applying acoustic echo cancellation and Bayesian model base voice spectrum filtering, the total computation involved is about 250 mega floating point operations (250M Flops).

Continuing with FIG. 6, separation filter 160 is decomposed into two orthogonal components that lie in the range and null space by QR orthogonalization procedures. That is, the signal blocking filter coefficient, F3, is obtained from the null space and the signal passing filter coefficient, F2, is obtained from the rank space. This process may be characterized as Generalized Sidelobe Canceler (GSC) approach. Further details of the GSC approach may be found in the article entitled "Beamforming: A Versatile Approach to Spatial Filtering" which has been incorporated by reference above.

Figure 7A:
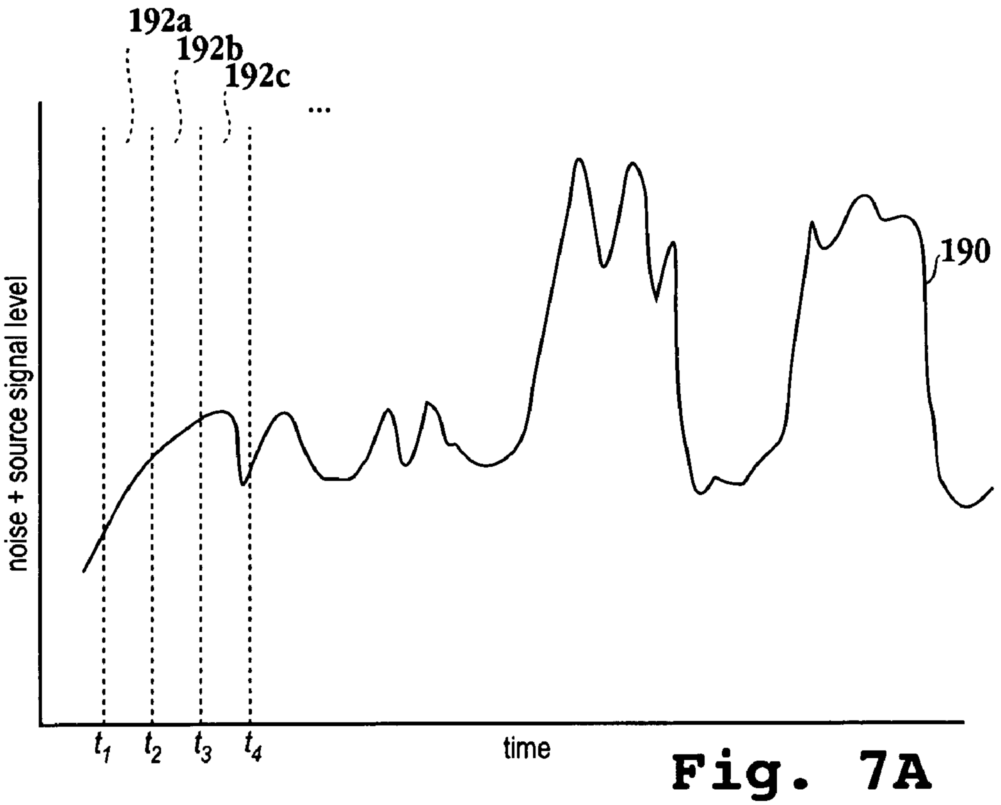
FIGS. 7A through 7C graphically represent the processing scheme illustrated through the framework of FIG. 6 in accordance with one embodiment of the invention.
Figure 7B:
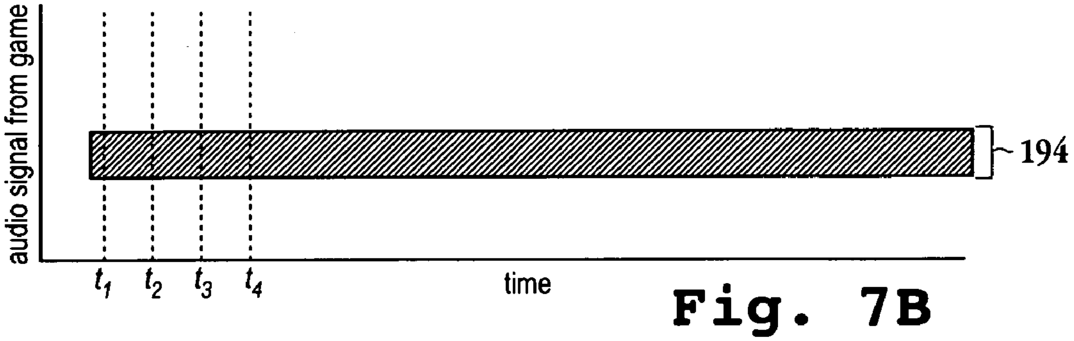
Figure 7C:
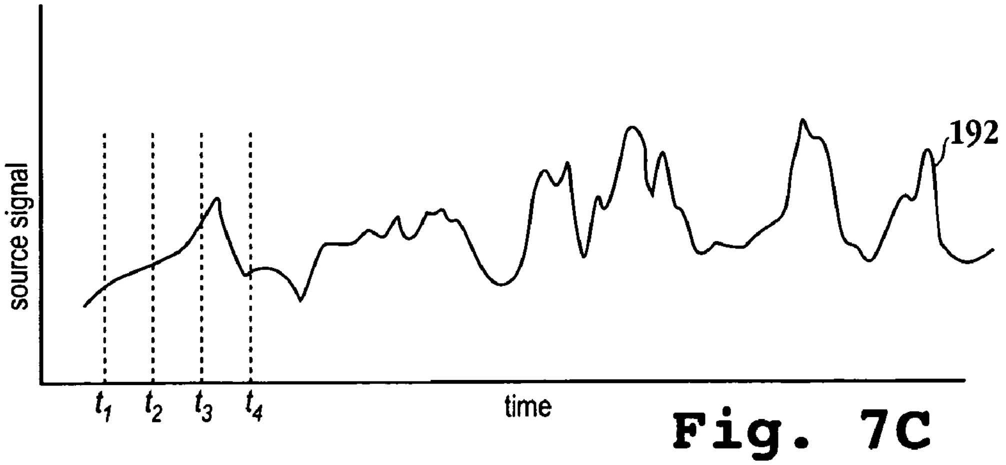

FIGS. 7A through 7C graphically represent the processing scheme illustrated through the framework of FIG. 6 in accordance with one embodiment of the invention. Noise and source signal level illustrated by line 190 of FIG. 7A has the audio signal from the game removed through acoustic echo cancellation where FIG. 7B represents the acoustic echo cancellation portion 194 of the noise and source signal level 190 of FIG. 7A. The adaptive array calibration process referred to above takes place periodically at distinct time periods, e.g., $t_1$ through $t_4$. Thus, after a certain number of blocks represented by regions 192*a* through 192*c* the corresponding calibration coefficients, F2 and F3, will become available for the corresponding filter-and-sum module and blocking filter module.

In one embodiment, at a sampling rate of 16 kHz, approximately 30 blocks are used at the initialization in order to determine the calibration coefficients. Thus, in approximately two seconds from the start of the operation, the calibration coefficients will be available. Prior to the time that the calibration coefficients are available, a default value will be used for F2 and F3. In one embodiment, the default filter vector for F2 is a Linear-Phase All-Pass FIR, while the default value for F3 is −F2. FIG. 7C illustrates the source signal where the acoustic echo cancellation, the adaptive beam-forming and the adaptive noise cancellation have been applied to yield a clean source signal represented by line 192.

Figure 8:
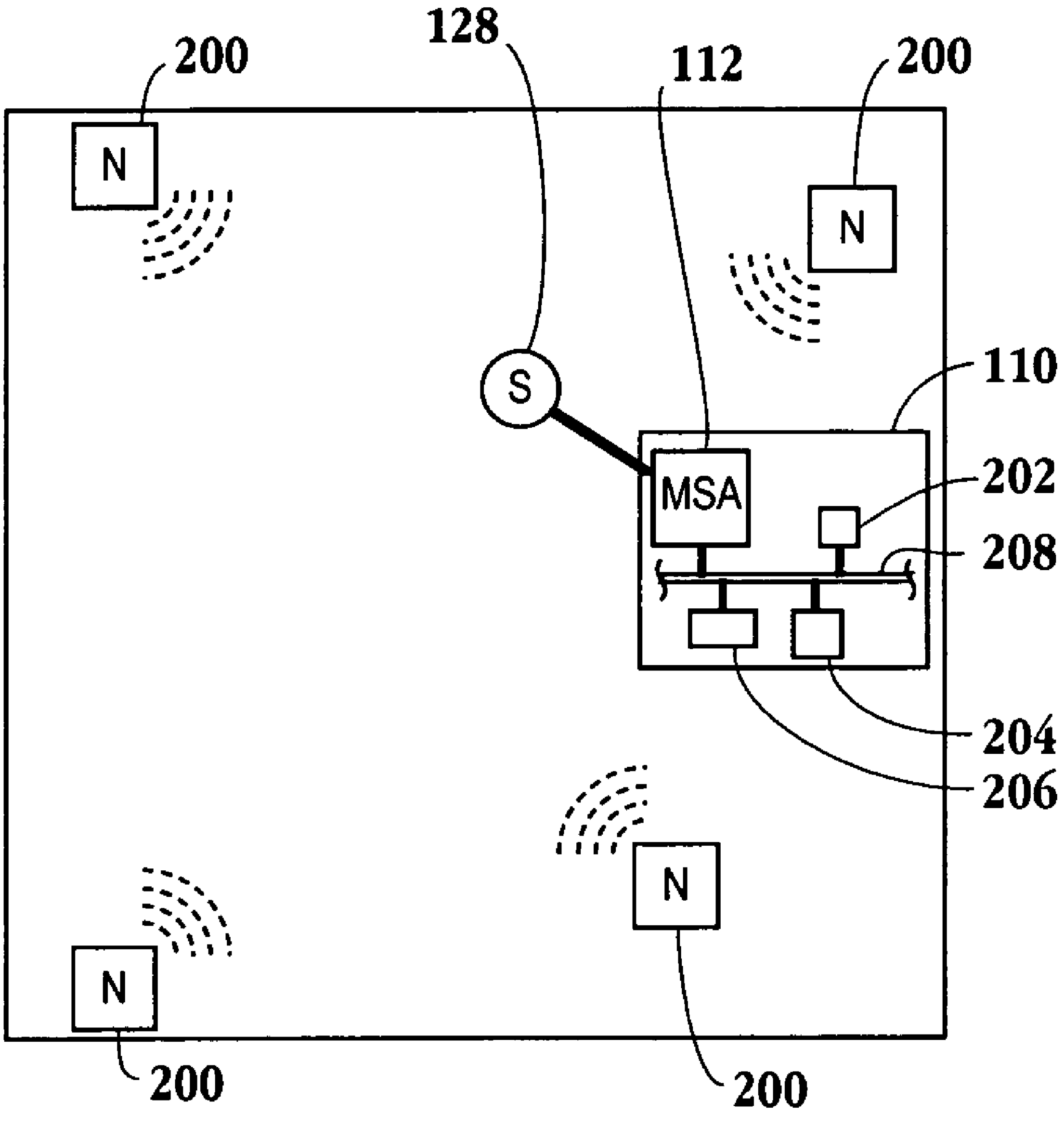
FIG. 8 is a simplified schematic diagram illustrating a portable consumer device configured to track a source signal in a noisy environment in accordance with one embodiment of the invention.

FIG. 8 is a simplified schematic diagram illustrating a portable consumer device configured to track a source signal in a noisy environment in accordance with one embodiment of the invention. Here, source signal 128 is being detected by microphone sensor array 112 along with noise 200. Portable consumer device 110 includes microprocessor, i.e., central processing unit (CPU) 206, memory 204 and filter and enhancing module 202. Central processing unit 206, memory 204, filter and enhancing module 202, and microphone sensor array 112 are in communication with each other over bus 208. It should be appreciated that filtering and enhancing module 202 may be a software based module or a hardware based module. That is, filter and enhancing module 202 may include processing instructions in order to obtain a clean signal from the noisy environment. Alternatively, filter and enhancing module 202 may be circuitry configured to achieve the same result as the processing instructions. While CPU 206, memory 204, and filter and enhancing module 202 are illustrates as being integrated into video game controller 110, it should be appreciated that this illustration is exemplary. Each of the components may be included in a video game console in communication with the video game controller as illustrated with reference to FIG. 2.

Figure 9:
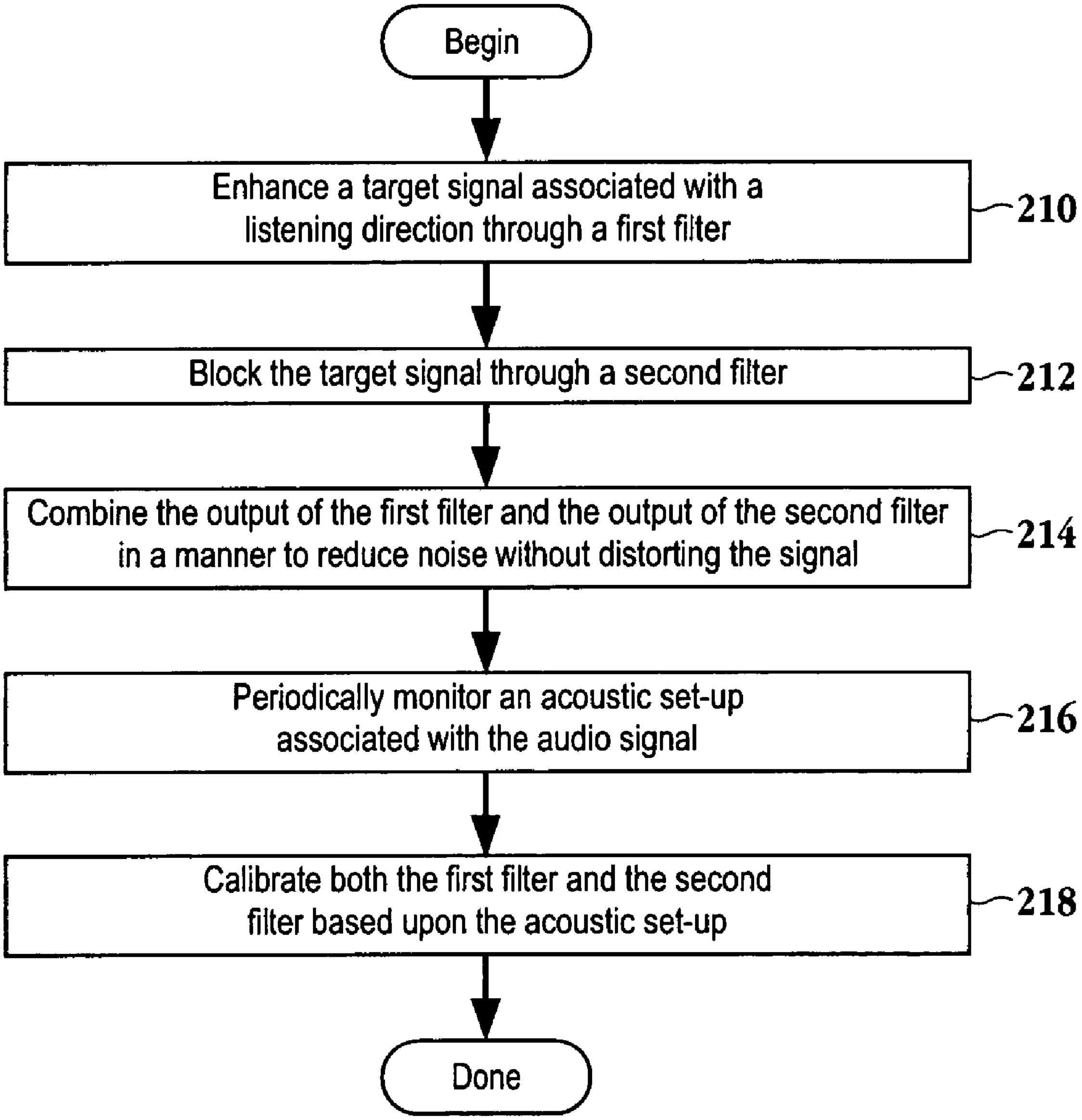
FIG. 9 is a flow chart diagram illustrating the method operations for reducing noise associated with an audio signal in accordance with one embodiment of the invention.

FIG. 9 is a flow chart diagram illustrating the method operations for reducing noise associated with an audio signal in accordance with one embodiment of the invention. The method initiates with operation 210 where a target signal associated with a listening direction is enhanced through a first filter. Here, adaptive beam-forming executed through a filter-and-sum module as described above may be applied. It should be appreciated that the pre-processing associated with acoustic echo cancellation may be applied prior to operation 210 as discussed above with reference to FIG. 6. The method then advances to operation 212 where the target signal is blocked through a second filter. Here, the blocking filter with reference to FIG. 6, may be used to block the target signal and enhance the noise. As described above, values associated with the first and second filters may be calculated through an adaptive array calibration scheme running in the background. The adaptive array calibration scheme may utilize blind source separation and independent component analysis as described above. In one embodiment, second order statistics are used for the adaptive array calibration scheme.

The method then proceeds to operation 214 where the output of the first filter and the output of the second filter are combined in a manner to reduce noise without distorting the target signal. As discussed above, the combination of the first filter and the second filter is achieved through adaptive noise cancellation. In one embodiment, the output of the second filter is aligned prior to combination with the output of the first filter. The method then moves to operation 216 where an acoustic set-up associated with the audio signal is periodically monitored. Here, the adaptive array calibration discussed above may be executed. The acoustic set-up refers to the position change of a portable consumer device having a microphone sensor array and the relative position to a user as mentioned above. The method then advances to operation 218 where the first filter and the second filter are calibrated based upon the acoustic setup. Here, filters F2 and F3, discussed above, are determined and applied to the signals for the corresponding filtering operations in order to achieve the desired result. That is, F2 is configured to enhance a signal associated with the listening direction, while F3 is configured to enhance signals emanating from other than the listening direction.

In summary, the above described invention describes a method and a system for providing audio input in a high noise environment. The audio input system includes a microphone array that may be affixed to a video game controller, e.g., a SONY PLAYSTATION 2® video game controller or any other suitable video game controller. The microphone array is configured so as to not place any constraints on the movement of the video game controller. The signals received by the microphone sensors of the microphone array are assumed to include a foreground speaker or audio signal and various background noises including room reverberation. Since the time-delay between background and foreground from various sensors is different, their second-order statistics in frequency spectrum domain are independent of each other, therefore, the signals may be separated on a frequency component basis. Then, the separated signal frequency components are recombined to reconstruct the foreground desired audio signal. It should be further appreciated that the embodiments described herein define a real time voice input system for issuing commands for a video game, or communicating with other players within a noisy environment.

It should be appreciated that the embodiments described herein may also apply to on-line gaming applications. That is, the embodiments described above may occur at a server that sends a video signal to multiple users over a distributed network, such as the Internet, to enable players at remote noisy locations to communicate with each other. It should be further appreciated that the embodiments described herein may be implemented through either a hardware or a software implementation. That is, the functional descriptions discussed above may be synthesized to define a microchip configured to perform the functional tasks for each of the modules associated with the microphone array framework.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for reducing noise associated with an audio signal received through a microphone sensor array of a game controller during game play, comprising:

detecting a target signal component and a noise signal component from at least two microphones integrated with the game controller;

enhancing the target signal component of the audio signal by executing a beam-forming operation performed through a first filter;

blocking the target signal component by executing a reverse beam-forming operation through a second filter;

aligning an output of the second filter through an adaptive filter;

combining an output of the first filter and an output of the adaptive filter so that noise signal component is reduced without distorting the target signal;

monitoring an acoustic set-up associated with the audio signal as a background process using the beam-forming operation of the first filter and the reverse beam-forming operation of the second filter to track the target signal component; and periodically setting a calibration of both a value of the first filter and a value of the second filter based upon the monitored acoustic set-up, the calibration of the values of the first filter and the second filter implements blind source separation that uses second order statistics to separate the target signal component from the noise signal component based on a frequency basis, to actively steer the first filter and the second filter toward the target signal component during game play, wherein the calibration remains fixed between the periodic setting;

wherein the target signal component is able to freely move around in 3-dimensional space with six degrees of freedom relative to the microphone array of the game controller.

2. The method of claim 1, wherein blind source separation enables separating the target signal component and the noise signal component; and further comprising, determining a time delay associated with each microphone sensor of the microphone senor array.

3. The method of claim 1, wherein the acoustic set-up refers to relative position of the target signal component of a user and the microphone sensor array.

4. The method of claim 1, wherein the method operation of periodically setting the calibrating occurs about every 100 milliseconds.

5. A system capable of isolating a target audio signal from multiple noise sources during active use, comprising:

a portable consumer device configured to move in positions that are independent from positions of a user during active use;

a computing device, the computing device including logic configured to enhance the target audio signal without constraining movement of the portable consumer device, the logic for enhancing the target audio signal using a beam-forming operation executed through a first filter, logic for blocking the target audio signal using a reverse beam-forming operation executed through a second filter, logic for aligning an output of the second filter through an adaptive filter, logic for monitoring an acoustic set-up as a background process using the beam-forming operation of the first filter and the reverse beam-forming operation of the second filter to track a position of the target audio signal, and logic for periodically setting a calibration of both the first filter and the second filter based upon the monitored acoustic set-up, the calibration of the first filter and the second filter implements blind source separation that uses second order statistics to separate the target audio signal from a noise signal based on a frequency basis, to actively steer the first and the second filter toward the position of the target audio signal during game play; and a microphone array affixed to the portable consumer device, the microphone array configured to capture audio signals, wherein a listening direction associated with the microphone away is actively adjusted only after each periodic setting of the calibration of both the first and second filters, during active use through the logic configured to enhance the target audio signal.

6. The system of claim 5, wherein the computing device is in communication within the portable consumer device.

7. The system of claim 6, wherein the computing device includes, logic for combining the output of the first filter and the output of the second filter in a manner to reduce noise without distorting the target signal.

8. The system of claim 5, wherein the microphone away is configured in one of a convex geometry and a straight line geometry.

9. The system of claim 5, wherein a distance between microphones of the microphone array is about 2.5 centimeters.

10. The system of claim 5, wherein the portable consumer device is a video game controller and the computing device is a video game console.

11. A system for enhancing a target audio signal, comprising:

a microphone array affixed to a video game controller, the microphone array configured to detect an audio signal that includes the target audio signal and noise;

a computing system including circuitry configured to process the audio signal when received by the microphone array of the game controller, the computing system including filtering and enhancing logic to filter the noise using a reverse beam-forming operation and enhance the target audio signal using a beam-forming operation, monitoring logic using the beam-forming operation and the reverse beam-forming operation as a background process to monitor a change in position of the video game controller relative to a position of a source of the target audio signal during game play, wherein the filtering of the noise and enhancing the target audio signal includes periodically setting a calibration of the logic to filter the noise to actively steer the filtering and enhancing logic toward the position of the source of the target audio signal, wherein the calibration implements blind source separation and second order statistics to separate the target audio signal from the noise based on a frequency basis, and wherein the calibration remains fixed between the periodic setting.

12. The video game controller of claim 11, further comprising:

adaptive array calibration logic to perform the periodic monitoring and calibration, the adaptive array calibration logic configured to calculate a separation filter value, the separation filter value capable of adjusting a listening direction associated with the microphone array.

* * * * *